United States Patent
Klein et al.

(10) Patent No.: US 10,807,428 B1
(45) Date of Patent: Oct. 20, 2020

(54) LEAF-SPRING SUSPENSION SYSTEMS WITH COMPLIANT OVERSIZED PIVOT BUSHINGS

(71) Applicants: Jason M. Klein, Springfield, MO (US); Kevin Schlack, Nixa, MO (US)

(72) Inventors: Jason M. Klein, Springfield, MO (US); Kevin Schlack, Nixa, MO (US)

( * ) Notice: Subject to any disclaimer, the term of this patent is extended or adjusted under 35 U.S.C. 154(b) by 73 days.

(21) Appl. No.: 15/864,490

(22) Filed: Jan. 8, 2018

Related U.S. Application Data

(60) Provisional application No. 62/443,044, filed on Jan. 6, 2017.

(51) Int. Cl.
| | | |
|---|---|---|
| *B60G 5/047* | (2006.01) | |
| *B60G 11/12* | (2006.01) | |
| *B60G 11/107* | (2006.01) | |
| *B60G 11/04* | (2006.01) | |

(52) U.S. Cl.
CPC ............ *B60G 5/047* (2013.01); *B60G 11/04* (2013.01); *B60G 11/107* (2013.01); *B60G 11/12* (2013.01); *B60G 2204/121* (2013.01); *B60G 2204/4104* (2013.01)

(58) Field of Classification Search
CPC ........ B60G 5/047; B60G 11/04; B60G 11/12; B60G 11/107; B60G 2204/4104; B60G 2204/121
USPC .................................... 267/141, 141.1–141.6
See application file for complete search history.

(56) References Cited

U.S. PATENT DOCUMENTS

| | | | | |
|---|---|---|---|---|
| 2,455,989 A | 12/1948 | Frazier | ............ | B60G 5/047 |
| 2,577,322 A | 12/1951 | Frazier | ............ | B60G 5/047 |
| 2,653,035 A | 9/1953 | Ward | ............ | B60G 5/047 |
| 2,958,526 A * | 11/1960 | Jurgen | ............ | F16F 1/387 267/292 |
| 3,123,377 A | 3/1964 | Hutchens | ............ | B60G 5/047 |
| 3,194,580 A | 7/1965 | Hamlet | ............ | B60G 11/04 |
| 3,304,096 A | 2/1967 | Hanover | ............ | B60G 5/047 |
| 3,493,222 A * | 2/1970 | Mathers | ............ | B60G 11/10 267/270 |
| 3,801,086 A * | 4/1974 | Raidel | ............ | B60G 9/003 267/67 |
| 3,933,367 A | 1/1976 | Tamas | ............ | B60G 5/047 |
| 4,003,562 A * | 1/1977 | Kaiser | ............ | B60G 11/12 267/268 |

(Continued)

OTHER PUBLICATIONS

Cush Corp. version of standard slipper spring type mechanical suspension with rigid torque arms and standard size torque rod bushings in the forward and trailing positions of each arm, an image taken from a product brochure of Crush Corp., copyright 2016.

(Continued)

*Primary Examiner* — Darlene P Condra
(74) *Attorney, Agent, or Firm* — Jonathan A. Bay

(57) ABSTRACT

A slipper and/or eyed leaf-spring vehicle suspension system is provided with a compliant oversized pivot bushing and a torque rod or control arm, respectively. Each of the torque rod or control arm are provided with at least one over-sized eye bushing-housing into which the compliant oversized pivot bushing is compressed into. The compliant oversized pivot bushing has an elastomeric annulus mounted on a rigid sleeve wherein compliant oversized pivot bushing has an overall outside diameter that is greater to much greater than its width.

17 Claims, 15 Drawing Sheets

(56) References Cited

U.S. PATENT DOCUMENTS

| | | | | |
|---|---|---|---|---|
| 4,033,606 A * | 7/1977 | Ward | ............... | B60G 5/047 |
| | | | | 280/682 |
| 4,166,640 A | 7/1979 | Van Denberg | ......... | B60G 9/003 |
| 4,213,718 A * | 7/1980 | Lumby | ............... | B60G 7/02 |
| | | | | 248/635 |
| 4,991,868 A | 2/1991 | Van Denberg | ............ | B60G 7/02 |
| 5,996,981 A | 12/1999 | Dilling | ............... | B60G 7/02 |
| 6,446,746 B1 * | 9/2002 | Bell | ............... | B60G 5/00 |
| | | | | 180/312 |
| 8,925,944 B2 * | 1/2015 | Byrnes | ............... | B60G 7/005 |
| | | | | 280/124.134 |
| 2002/0096841 A1 * | 7/2002 | Hedenberg | ........... | B60G 11/465 |
| | | | | 280/6.159 |
| 2003/0132593 A1 * | 7/2003 | Ross | ............... | B60G 7/02 |
| | | | | 280/124.1 |
| 2004/0056397 A1 * | 3/2004 | Tatura | ............... | F16F 1/387 |
| | | | | 267/140.12 |
| 2007/0069495 A1 * | 3/2007 | Middlebrook | ......... | B60G 9/003 |
| | | | | 280/124.116 |
| 2008/0277847 A1 * | 11/2008 | Missig | ............... | F16C 27/063 |
| | | | | 267/141.3 |
| 2014/0117176 A1 * | 5/2014 | Pierce | ............... | B60T 17/088 |
| | | | | 248/205.1 |
| 2014/0117639 A1 * | 5/2014 | Ramsey | ............... | B60G 9/04 |
| | | | | 280/124.11 |
| 2016/0207370 A1 * | 7/2016 | Moeller | ............... | B60G 11/08 |
| 2017/0166024 A1 * | 6/2017 | Andreasen | ............... | F16B 39/28 |
| 2017/0166025 A1 * | 6/2017 | Auten | ............... | B60G 11/12 |

OTHER PUBLICATIONS

Volvo White GMC tractor spring suspension, taken from a page of a parts catalog belonging to EUCLID® Industries, LLC (an ARVIN MERTIOR® brand), copyright 2002.

* cited by examiner

LEAF-SPRING SUSPENSION SYSTEMS WITH COMPLIANT OVERSIZED PIVOT BUSHINGS

CROSS-REFERENCE TO PROVISIONAL APPLICATION(S)

This application claims the benefit of U.S. Provisional Application No. 62/443,044, filed Jan. 6, 2017. The foregoing patent disclosure is incorporated herein by this reference thereto.

BACKGROUND OF THE INVENTION

The invention relates to heavy duty vehicle suspensions and, more particularly, to improvements to a combination bushing and torque rod (or an improved combination of a bushing and control arm in one embodiment) for spring suspension systems.

In general, spring suspension systems for heavy duty vehicle suspensions can be classified in three (3) broad categories.

I. Slipper leaf-spring suspension systems.
II. Eyed leaf-spring suspension systems.
III. Air-spring suspension systems.

It is believed that industry generally rates the three different categories as follows.

Air-spring suspension systems are rated the best as far as overall ride comfort but are also generally the costlier and heavier option of the three.

Eyed leaf-spring suspension systems with eyes at both ends of the leaf spring (or leaf-spring stack) generally provide the roughest ride performance when scaled to heavy duty rating, especially when the load is empty. But they remain popular for economy light-duty trailers such as for aluminum fishing boats and the like.

Slipper leaf-spring suspension systems are a good intermediate choice between the two other choices in terms of 'loaded' ride performance, cost and weight. Where slipper leaf-spring suspension systems are really poorly rated is when the trailer is traveling unloaded. At those times, the trailers bounce on their slipper leaf-spring suspension systems almost out of control, because of lack of damping.

To state this differently, mechanical leaf-spring suspension systems have been commonplace in the trailer industry for a long time. However, in more recent times, air-spring axle suspension systems have become popular in the heavy-duty tractor-trailer industry over the last twenty years because of their improved ride characteristics, driver comfort, and maneuverability over obstacles. Drawbacks to air-spring suspension systems include their complexity of design and increased service parts when compared to the slipper leaf-spring category of mechanical leaf-spring suspension systems.

Note that, both slipper leaf-spring suspension systems and eyed leaf-spring suspension systems might comprise a plurality (even multiplicity) of individual steel leaf springs stacked in a stack.

The following remarks are provided in further overview review of the prior art of each of these three categories.

I. Prior Art Slipper Leaf-Spring Suspension Systems.

Slipper leaf-spring suspension systems perform well to vertical load inputs when the vehicle is loaded but do not when the slipper leaf-springs are lightly loaded. Also, a slipper leaf-spring suspension uses a spring that has two unrestrained ends that slip on vehicle frame hangers with wear pads and the spring is held in place by suspension torque rods (sometimes control arms). These torque rods (or control arms) perform poorly to fore and aft road inputs because they have small elastomer bushings at each end and do not provide adequate damping of the road inputs fore and aft. Any road bump is going to provide an applied force at about a 450 up through the suspension system, so there won't just only be a vertical component but a fore to aft component as well. The small elastomeric bushings are typically of either rubber or polyurethane construction.

Representative patent disclosures on prior art slipper leaf-spring suspension systems include:
- U.S. Pat. No. 2,455,989—Frazier;
- U.S. Pat. No. 2,577,322—Frazier;
- U.S. Pat. No. 2,653,035—Ward;
- U.S. Pat. No. 3,123,377—Hutchens (wherein FIG. 1 therein shows torque arm 46; FIG. 5 therein shows not only spring bearing surface 20 but also, at the upper left end of torque arm 46, a standard torque arm pivot bushing illustrated in side elevation (but not indicated); and, FIG. 2 therein shows that standard torque arm pivot bushing of FIG. 5 in cross-section);
- U.S. Pat. No. 3,194,580—Hamlet;
- Cush Corporation's version of standard slipper leaf-spring type mechanical suspension with rigid torque arms and standard size torque rod bushings in the fore and aft positions of each arm (disclosed in Applicant's IDS as reference AR); and
- Prior Art of Volvo Bushing slipper Leaf-spring Suspension control arm with slipper leaf-spring stack (disclosed in Applicant's IDS as reference AS).

II. Prior Art Eyed Leaf-Spring Suspension Systems.

Spring suspension designs in the past have also incorporated an eyed leaf-spring either as a separate leaf spring with an eye for a bushing to replace the common torque rod arm for a slipper leaf-spring stack or with the eye incorporated into the leaf spring so as not to require a torque arm. This bushing eye is to control the brake torque and provide axle alignment. The designs that use eyed spring configurations also use conventional small elastomer bushing to control the movement of the suspension system. Current spring eye bushings are not of substantial size to provide enough elastomeric compliant mass for fore and aft suspension damping similar to what is used in current air-spring suspensions.

Representative patent disclosures on prior art eyed leaf-spring suspension systems include:
- U.S. Pat. App. Publ. No. 2014/0117639—Ramsey (with an eye at the forward end of the leaf spring and slipper arrangement at the trailing end);
- U.S. Pat. No. 3,304,096—Hanover (with eyes at both end of the leaf spring); and
- U.S. Pat. No. 3,933,367—Tamas (with an eye at the forward end of the leaf spring and slipper arrangement at the trailing end).

III. Prior Art Air-Spring Pivot Bushings.

It has been found that one of the key components of an effective air-spring suspension is an oversized elastomer pivot bushing made of rubber or urethane at the forward portion of the air-spring suspension trailing arms. As the air spring and shock of the air-spring suspensions system control and dampen the vertical road inputs, the oversized pivot bushing at the front of the trailing arms of the air-spring suspension dampens and controls the fore and aft road inputs. This oversized pivot bushing is substantial enough for reaction to control static loads, roll moments, and braking forces. This oversized bushing is available for air-spring suspensions as a wide or narrow bushing configuration and can be solid rubber or urethane or have a differential vertical and horizontal spring rate characteristics with voids or other means.

Representative patent disclosures on prior art air-spring suspension systems with oversized wide and narrow types of pivot bushings include:

U.S. Pat. No. 4,166,640—Van Denberg (wide and with cavities 61);
U.S. Pat. No. 4,991,868—Van Denberg (wide and with cavities 45); and
U.S. Pat. No. 5,996,981—Dilling (narrow and with voids 117).

What is needed is an improvement to overcome the shortcomings of the prior art.

SUMMARY OF THE INVENTION

It is an object of the invention to improve slipper leaf-spring suspension systems for tractor trailers and other heavy-duty wheeled vehicles. The slipper leaf-springs carry the vehicle weight (including load). Torque rods or control arms (or eyed leaf-springs) are included to assist the maintaining of axle placement.

It is another object of the invention to solve the problems inherent with leaf-spring suspension systems of poor ride quality and maneuverability by incorporation of a compliant oversized pivot bushing in accordance with the invention.

It is a further object of the invention to provide torque rods with compliant oversized pivot bushings at one end (preferably the front, or hanging end) that not only provide positive axle placement but also provide fore and aft road shock dampening due to the oversized configuration of the compliant elastomeric outer ring. This gives the inventive suspension system better ability to handle road bumps without the tires and/or trailer being launched into bounce mode, and which therefor gives better ride quality not only when the trailer is loaded but also unloaded too. Note that, any road bump is going to provide an applied force at about a 45 up through the suspension system, and as through the forward hung torque rod, so there won't just only be a vertical component into the suspension system but a fore to aft component as well.

It is a further object of the invention to design a torque rod and attendant assembly structures to allow the mounting and utilization of such a compliant oversized pivot bushing in accordance with the invention.

Inventive aspects of the compliant oversized pivot bushing include that the elastomer proportions are such that the bushing is much larger in diameter than the bushing is widest at its widest width between its sidewalls.

It is still another object of the invention to reduce the width of the torque rod to a laterally compact (ie., slender) form.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

DETAILED DESCRIPTION OF THE PREFERRED EMBODIMENTS

Figure 1:
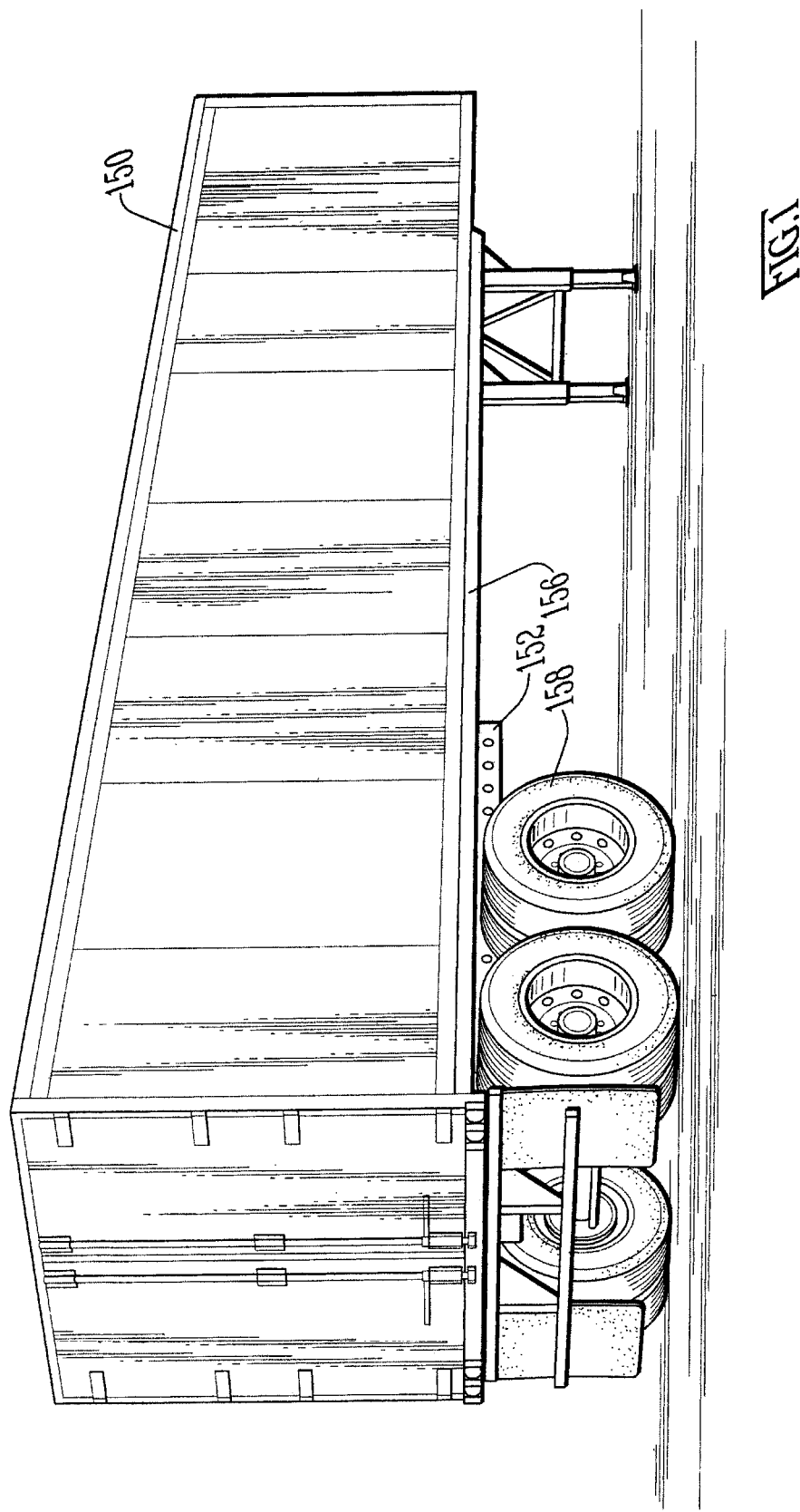
FIG. 1 is a perspective view of a conventional heavy-duty vehicle (eg., a semi-trailer constructed for a heavy-duty load rating) and is mounted on a suspension system in accordance with the invention (not in view, but see FIG. 2) for a heavy-duty vehicle suspension.
Figure 2:
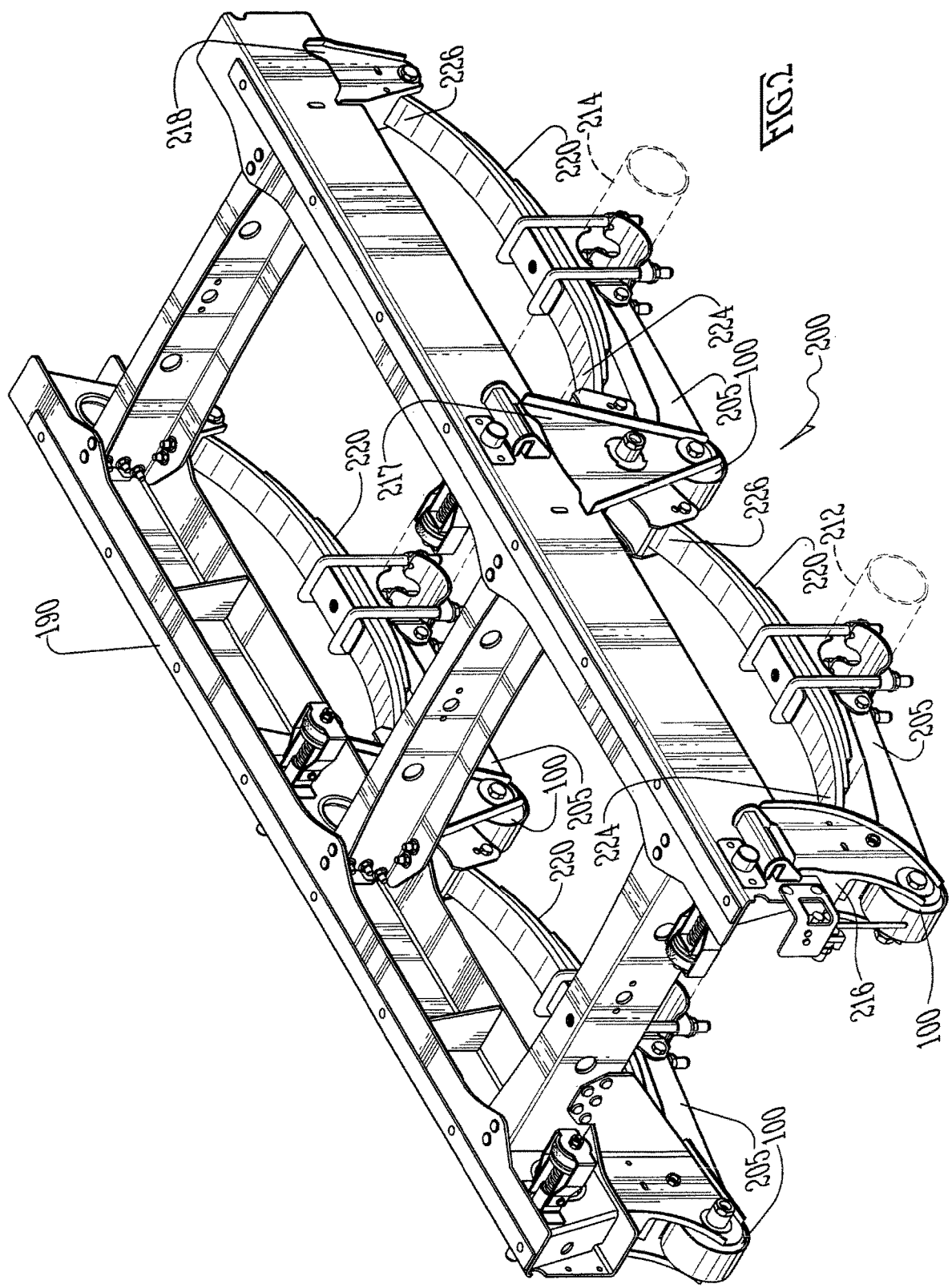
FIG. 2 is an enlarged-scale perspective view of a slipper leaf-spring suspension system in accordance with the invention provided with a compliant oversized pivot bushing for a torque rod, which is executed in a relatively slender design also in accordance with the invention.
Figure 3:
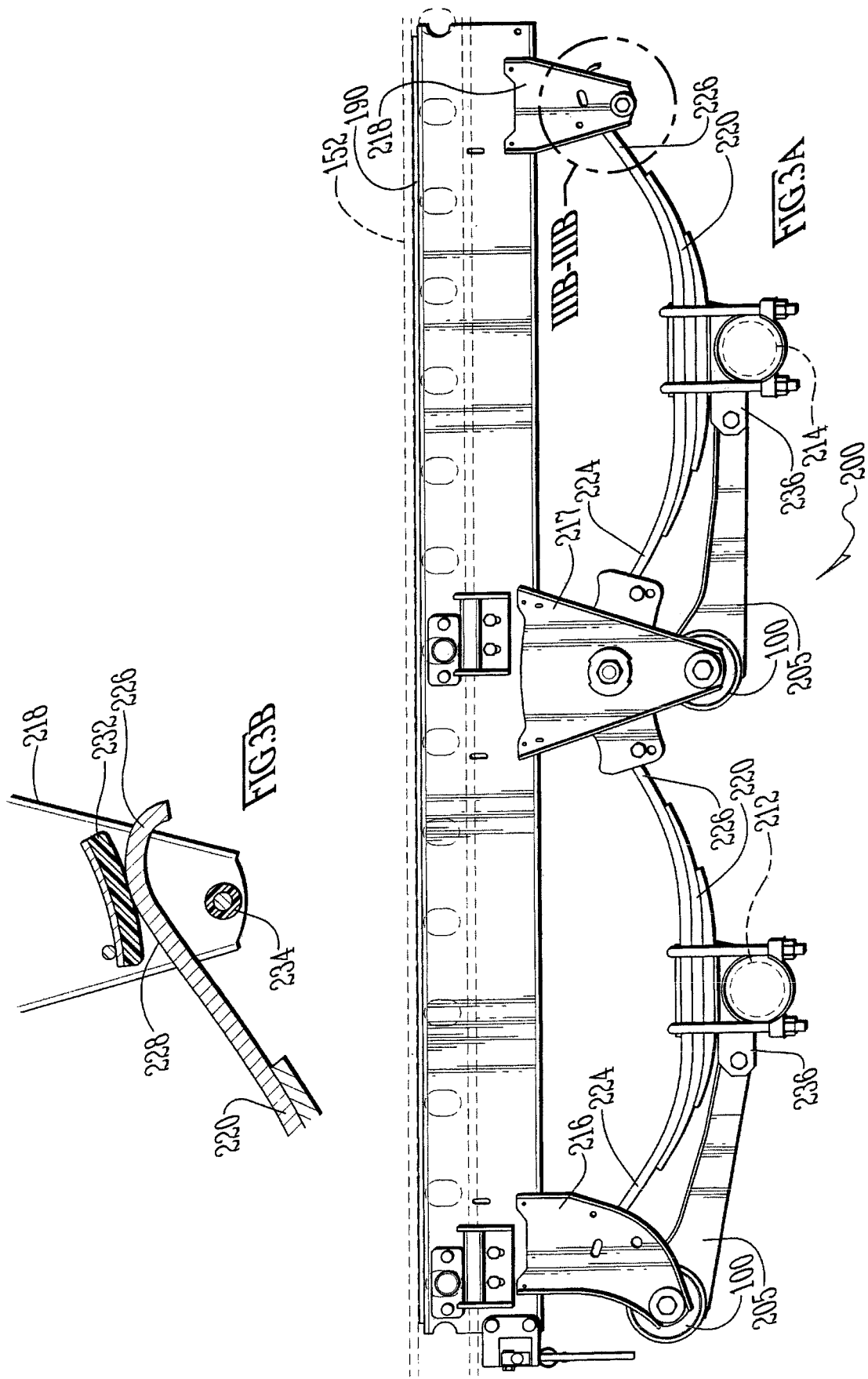
FIG. 3A is a side elevational view thereof.
FIG. 3B is an enlarged-scale side elevational view of detail IIIB-IIIB in FIG. 3A.
Figure 4:
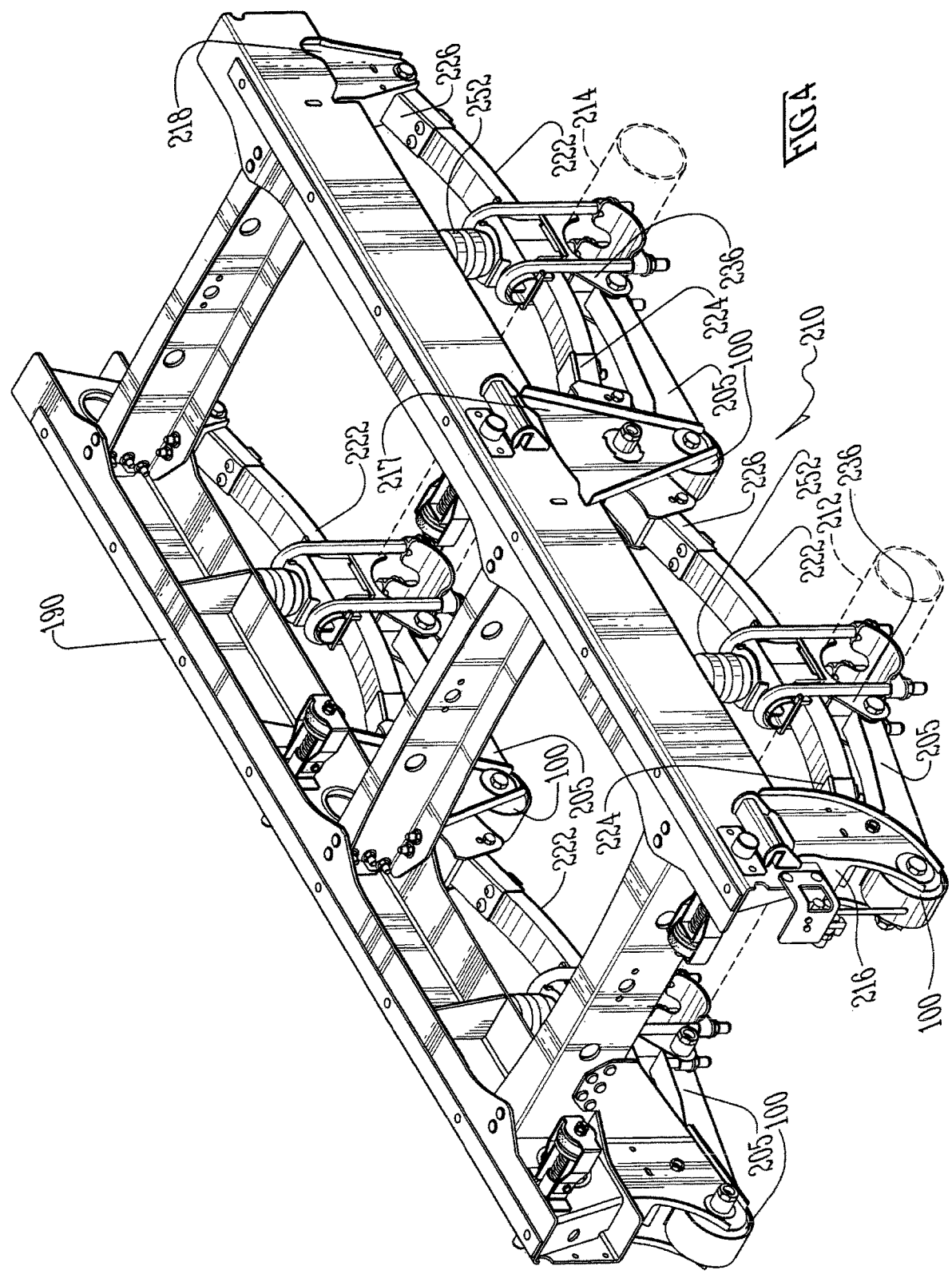
FIG. 4 is a perspective view of an alternate embodiment of slipper leaf-spring suspension system in accordance with the invention and comparable to FIG. 2, being provided with a compliant oversized pivot bushing in accordance with the invention and a slender torque rod in accordance with the invention, except also including inventive composite leaf springs and jounce bumpers.

FIG. 1 shows a non-exclusive example of a conventional heavy-duty vehicle 150 (eg., a semi-trailer constructed for a heavy-duty load rating) that is mounted on a sliding sub-frame 190 in accordance with the invention (not in view, but see FIG. 2) for a heavy-duty vehicle suspension 200 (see, eg., FIG. 2) and/or 210 (see, eg., FIG. 4). FIG. 2 indeed shows the sliding sub-frame 190 in accordance with the invention, and FIG. 3 is an enlarged-scale view of the lower two-thirds of FIG. 2.

The vehicle 150 has at least a pair of under-hung tracks 152 from which a sub-frame 190 might be slid between forward and rearward extremes. In FIG. 1, the exemplary heavy-duty vehicle 150 is a semi-trailer. The loads the trailer 150 can carry can be heavy.

It is an aspect of the invention to improve heavy-duty leaf-spring suspension systems, which while are known to be advantageous in applications which require strength, but are also known to be disadvantageous for smooth ride performance, especially when the trailer 150 is unloaded.

FIGS. 2 and 3 show a first embodiment of a leaf-spring suspension system 200 in accordance with the invention provided with a compliant oversized pivot bushing 100 for a torque rod 205, wherein the implementation of the torque rod 205 is executed in a relatively slender design.

More particularly, FIGS. 2 and 3 show a slipper-type of leaf-spring suspension system 200 in accordance with the invention.

Figure 5:
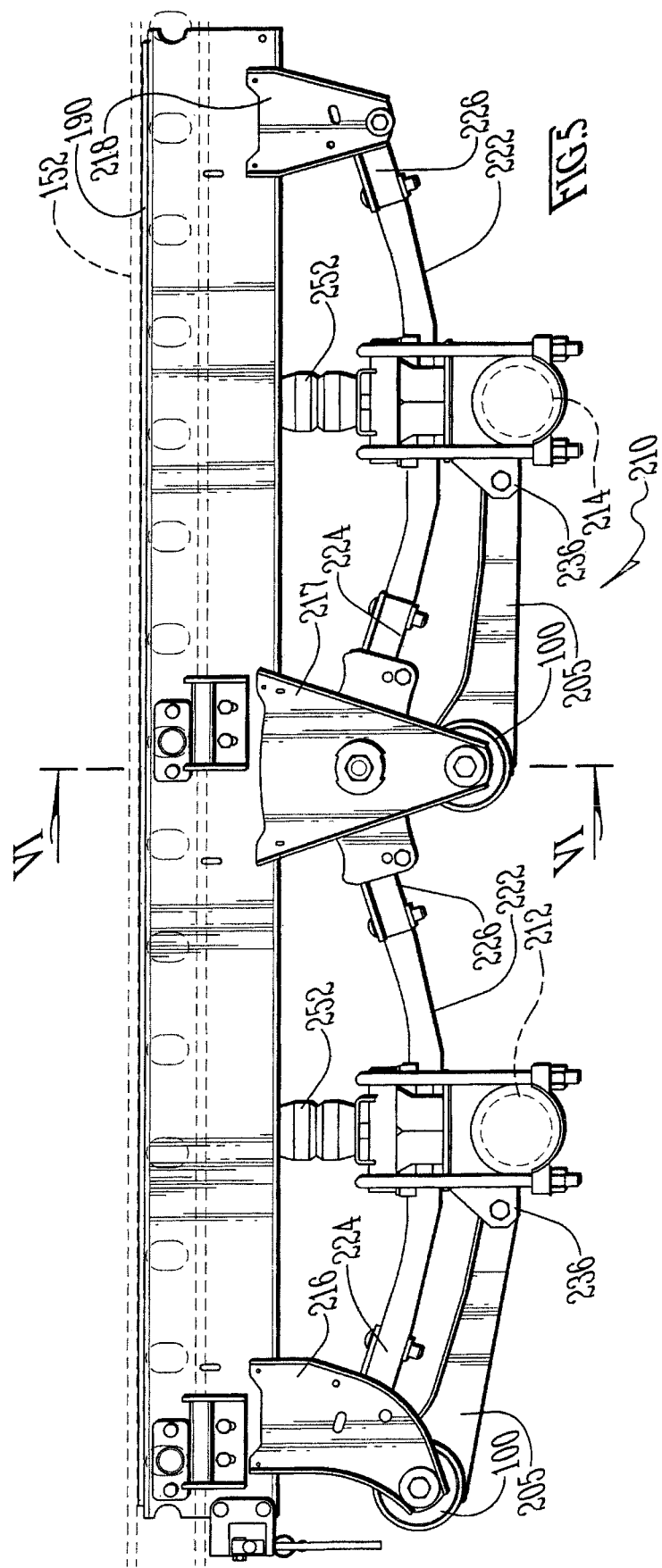
FIG. 5 is a side elevational view thereof.

FIGS. 4 and 5 show a second embodiment of (again) a slipper-type leaf-spring suspension system 210 in accordance with the invention.

Figure 6:
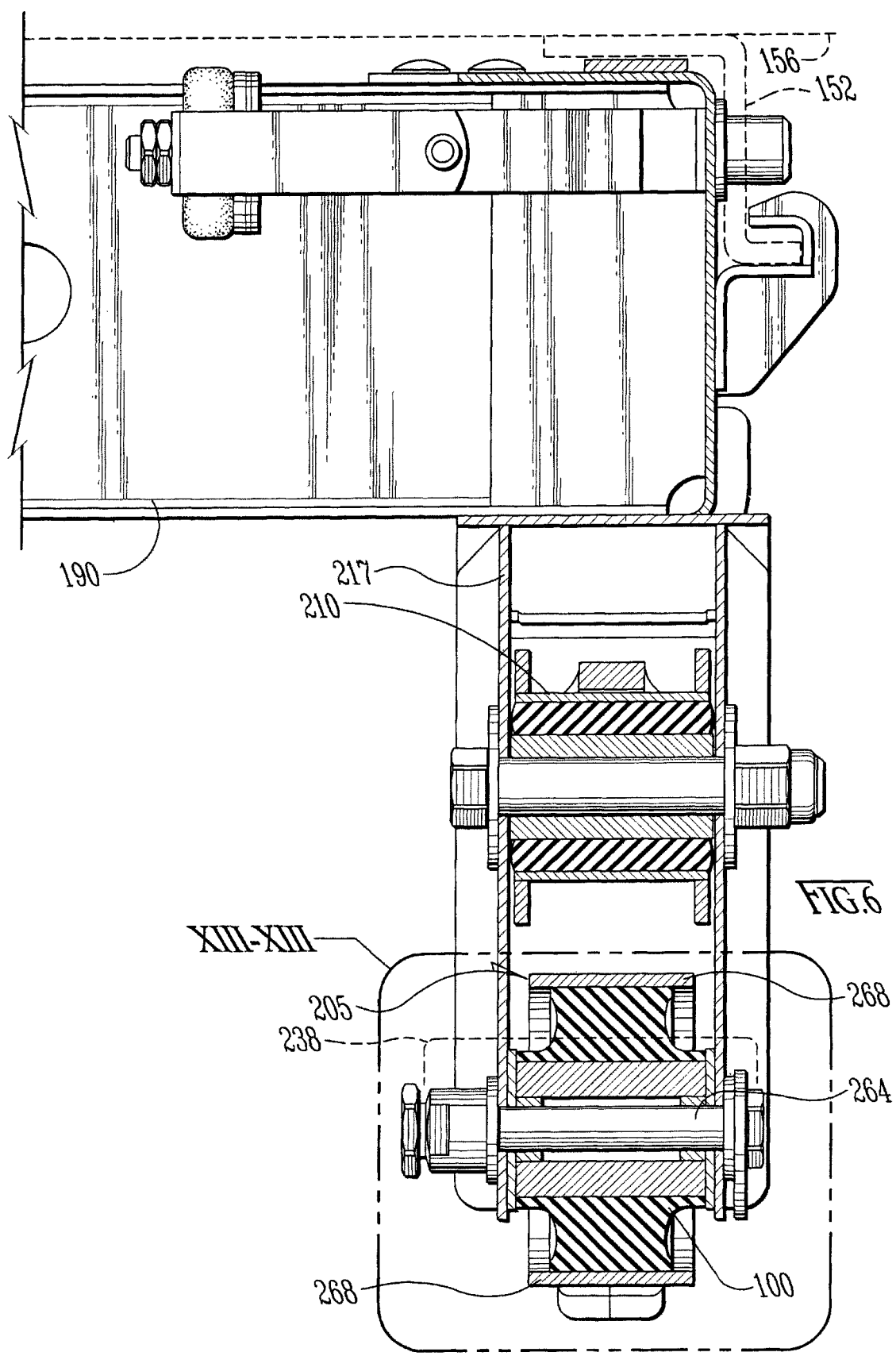
FIG. 6 is an enlarged-scale partial sectional view taken along line VI-VI in FIG. 5.

FIG. 6 is a sectional view through the compliant oversized pivot bushing 100 and its mounting in the torque rod 205.

Figure 7:
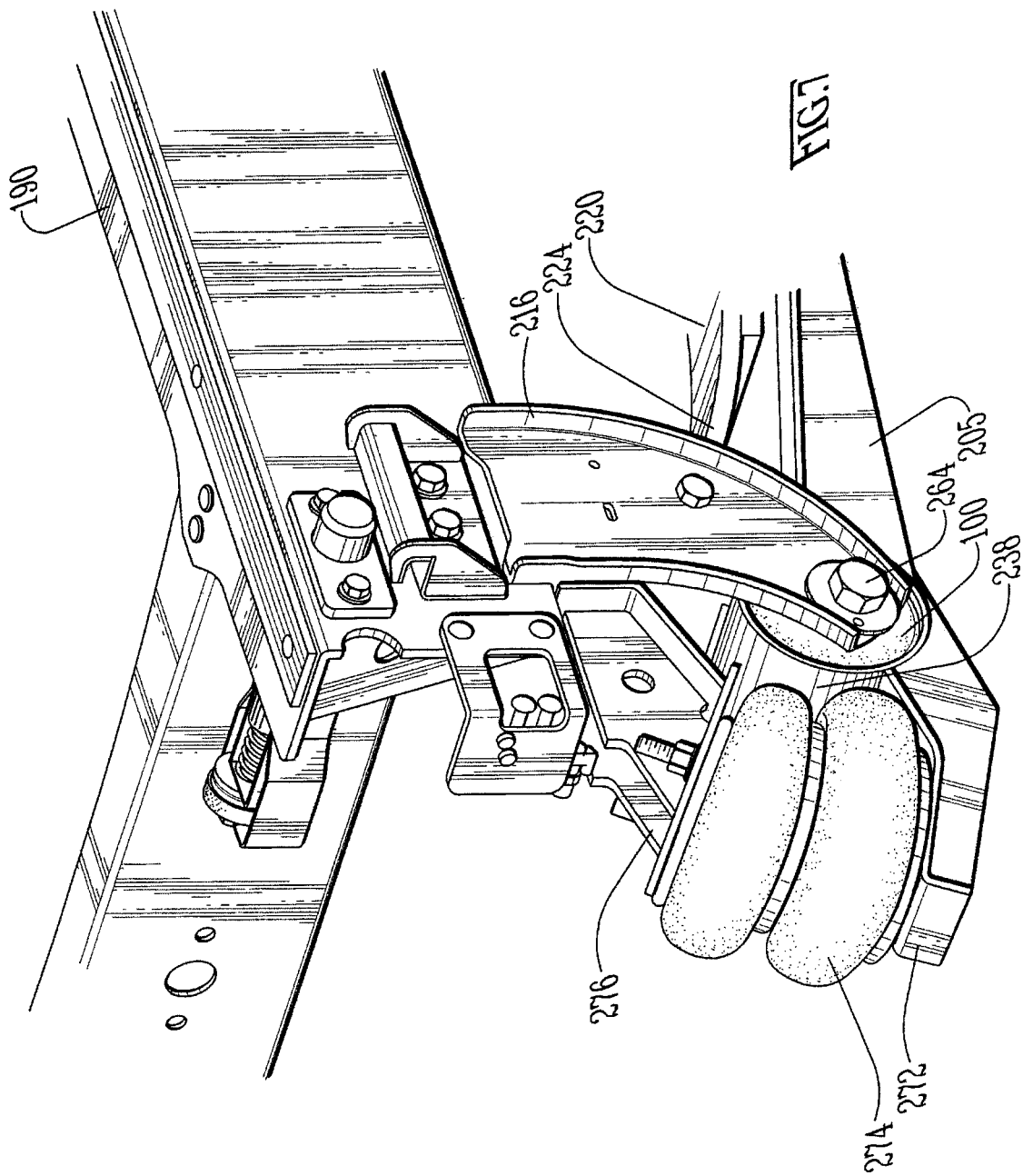
FIG. 7 is an enlarged-scale detail perspective view of an alternate embodiment of slipper leaf-spring suspension system in accordance with the invention and comparable to FIG. 2, being provided with a compliant oversized pivot bushing in accordance with the invention and a slender torque rod in accordance with the invention, except also including an inventive front air-spring lift kit.
Figure 8:
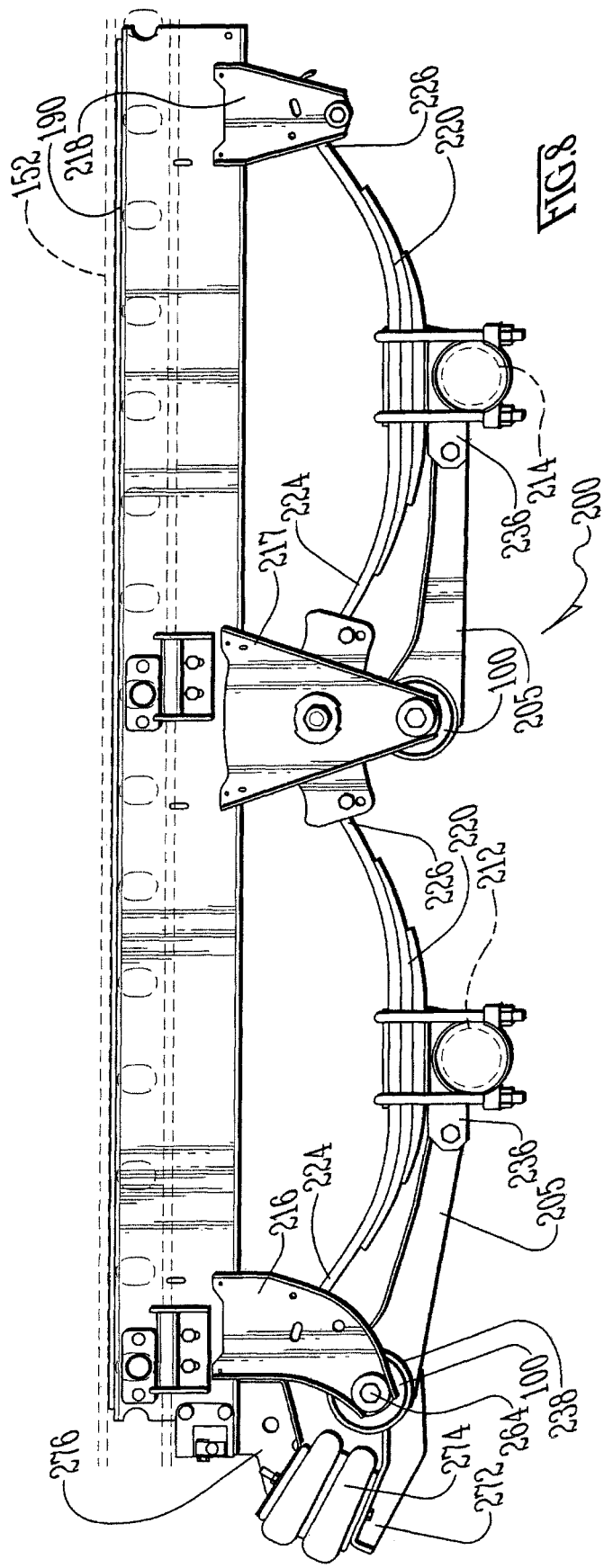
FIG. 8 is a reduced-scale side elevational view of the entire suspension system of FIG. 7.

FIGS. 7 and 8 show a slipper-type leaf-spring suspension system 200 in accordance with the invention with an axle-lift air spring 274.

Figure 9:
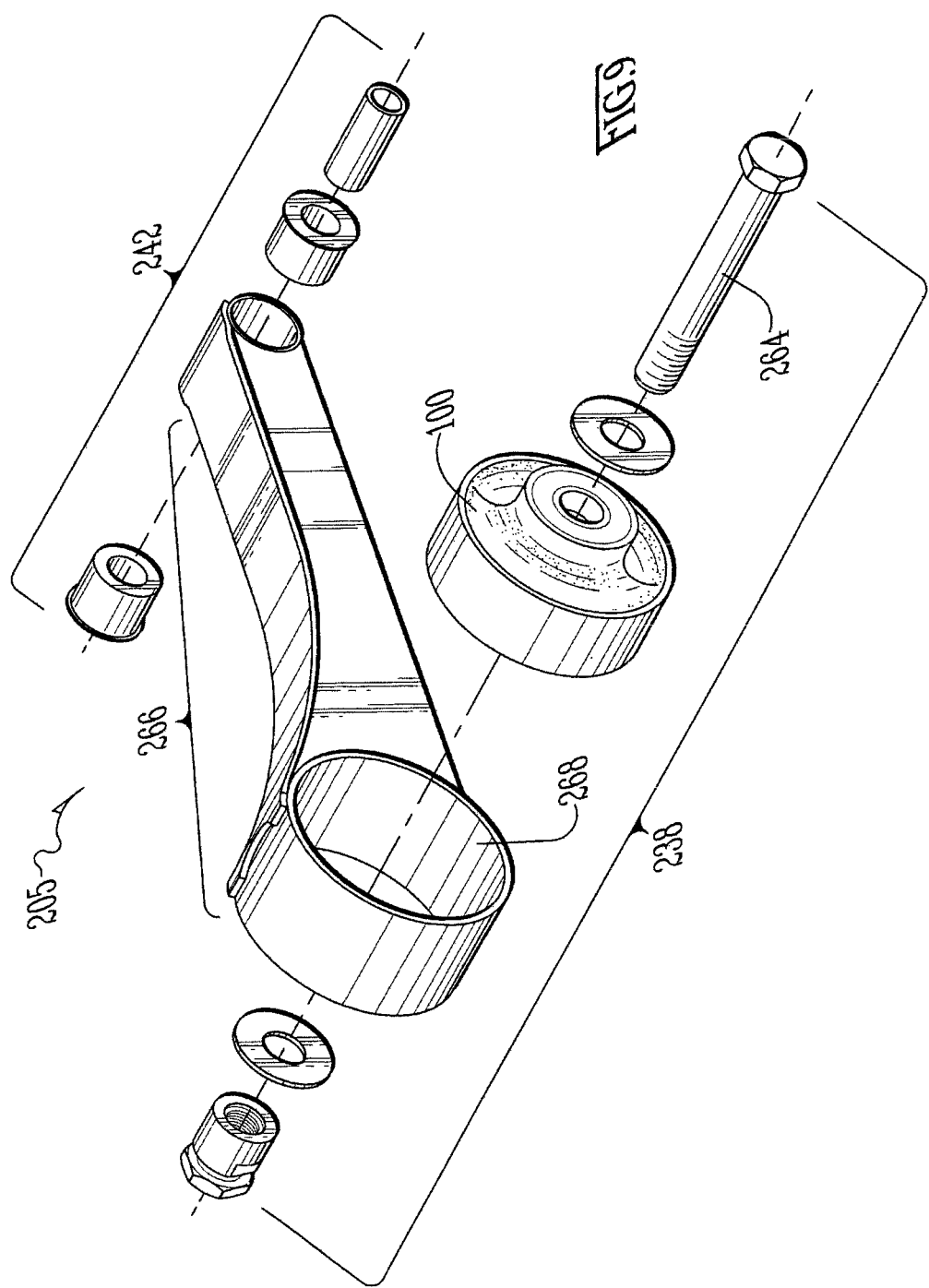
FIG. 9 is an enlarged-scale exploded perspective view of the relatively slender torque rod and compliant oversize pivot bushing in accordance with the invention and, excluding some attendant hardware, in isolation.

FIG. 9 is an exploded perspective view of the torque rod 205 and compliant oversize pivot bushing 100 in accordance with the invention, shown in isolation (excluding the inclusion of some attendant hardware).

These slipper-type leaf-spring suspension systems 200 and/or 210, as shown in the drawings, have the following aspects.

A sub-frame 190 is constructed in a box construction of structural channel or I-beam steel. For a tandem axle design 212/214 (eg., front axle 212 and rear axle 214), six hangers 216-218 are suspended below the sub-frame 190:—there a pair of laterally-spaced forward hangers 216, a pair of laterally-spaced middle hangers 217, and pair of laterally-spaced trailing hangers 218.

Again, for a tandem axle design 212/214, there are four slipper-type leaf springs 220 or 222 (eg., leaf-spring constructions). FIGS. 2-3 and 7-8 show a leaf spring construction 220 comprising a plurality of individual steel leaf springs stacked in a stack. FIGS. 4-5 each show a leaf spring construction 222 showing a single bar of composite material.

These slipper-type leaf springs 220 or 222 shown here (regardless of construction) are elongate between spaced forward and trailing ends 224 and 226, respectively, and show a shallow U-shaped bow in side profile. The slipper leaf-springs 220 or 222 are, proximate their ends 224 and 226, generally strips of plate or bar stock such that, while not tremendously beefy, are wider than they are thick. The slipper leaf-springs 220 or 222 have, proximate their ends 224 and 226, upper broad surfaces 228 and lower broad surfaces flanked between spaced relatively thinner sides. The hangers 216-218 present downward-facing wear pads 232 for the upper broad surfaces 228 of the slipper leaf-springs 220 or 222 to rub against and translate therealong as the springs 220 or 222 flex between relative straightening and relative sagging.

If the bouncing is too severe, the upper broad surfaces 228 can separate from the wear pads 232. There is typically a keeper pin 234 (bolt shank) to limit the downward separation of the ends 224 and 226 of the slipper leaf-springs 220 or 222. In the industry, the rejoining of the ends 224 and/or 226 of the slipper leaf-springs 220 or 222 with the wear pads 232 is referred to as 'spring slap.'

Again, the slipper leaf-springs 220 or 222 have a shallow U-shaped bow in side profile. At the belly of this shallow U-shaped bow in side profile there is usually a fastened or an affixed axle seat or housing 236. Hence for a tandem axle 212/214 arrangement, there will typically be four slipper leaf-springs 220 (or 222). More particularly, there will be a spaced apart forward pair of slipper leaf-springs 220 (or 222) spanning between a forward and middle hanger 216 and 217 respectively. There will be a spaced apart trailing pair of slipper leaf-springs 220 (or 222) spanning between a middle and trailing hanger 217 and 218 respectively.

Slipper leaf-springs 220 might have the very tip ends (see, eg., 226 in FIG. 3B) which extend clear beyond the respective wear pad 232 or keeper pin 234, bent downward in a gentle hook or an abrupt crease.

FIGS. 2-8 (and as well as by FIG. 9 best) also show that the suspension systems 200 and 210 in accordance with the invention also include four (4) rigid torque rods 205.

The torque rods 205 are elongate between a forward pivot-eye structure 238 and a trailing pivot-eye structure 242. Somewhat like the slipper leaf springs 220 or 222, there will be a spaced apart forward pair of torque rods 205 spanning between a pivot connection with a forward hanger 216 and an axle seat or housing 236 for the forward axle 212 (ie., the connection of the trailing pivot-eye structure 242 with the axle seat or housing 236 is also a pivot connection). There will be a spaced apart trailing pair of torque rods 205 spanning between a pivot connection with a middle hanger 217 and an axle seat or housing 236 of the rear axle 214. FIG. 6 provides a cross sectional view of ● a forward pivot-eye structure 238 pivot connection between ● a trailing torque rod 205 and ● a middle hanger 217.

For each torque rod 205, it is preferred to configure the forward pivot-eye structure 238 to receive the compliant oversized pivot bushing 100 in accordance with the invention. The trailing pivot-eye structure 242 can be designed to be anywhere in between to accepting the compliant oversized pivot bushing (this is not shown) in accordance with the invention, or else, just left in a standard conventional prior art pivot connection configuration (eg., 242 as shown).

Figure 10:
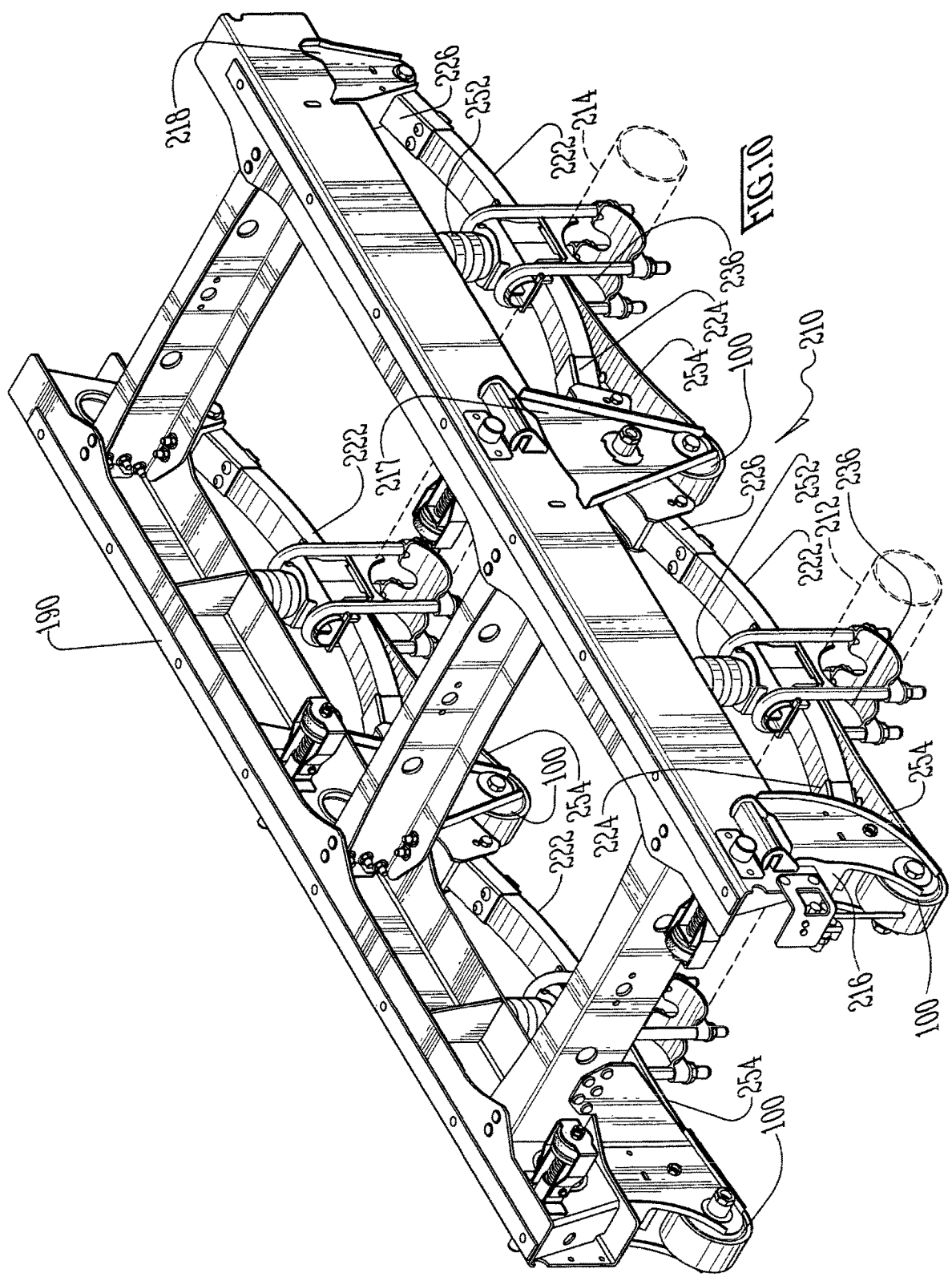
FIG. 10 is a perspective view of an alternate embodiment of leaf-spring suspension system in accordance with the invention and comparable to FIG. 4, except comprising an 'eyed' leaf-spring suspension system with a compliant oversized pivot bushing, composite leaf springs and jounce bumpers, except wherein the rigid torque rod is replaced with an eyed leaf-spring control arm of standard leaf spring steel and with the eye configured to receive the inventive compliant oversized pivot bushing.
Figure 11:
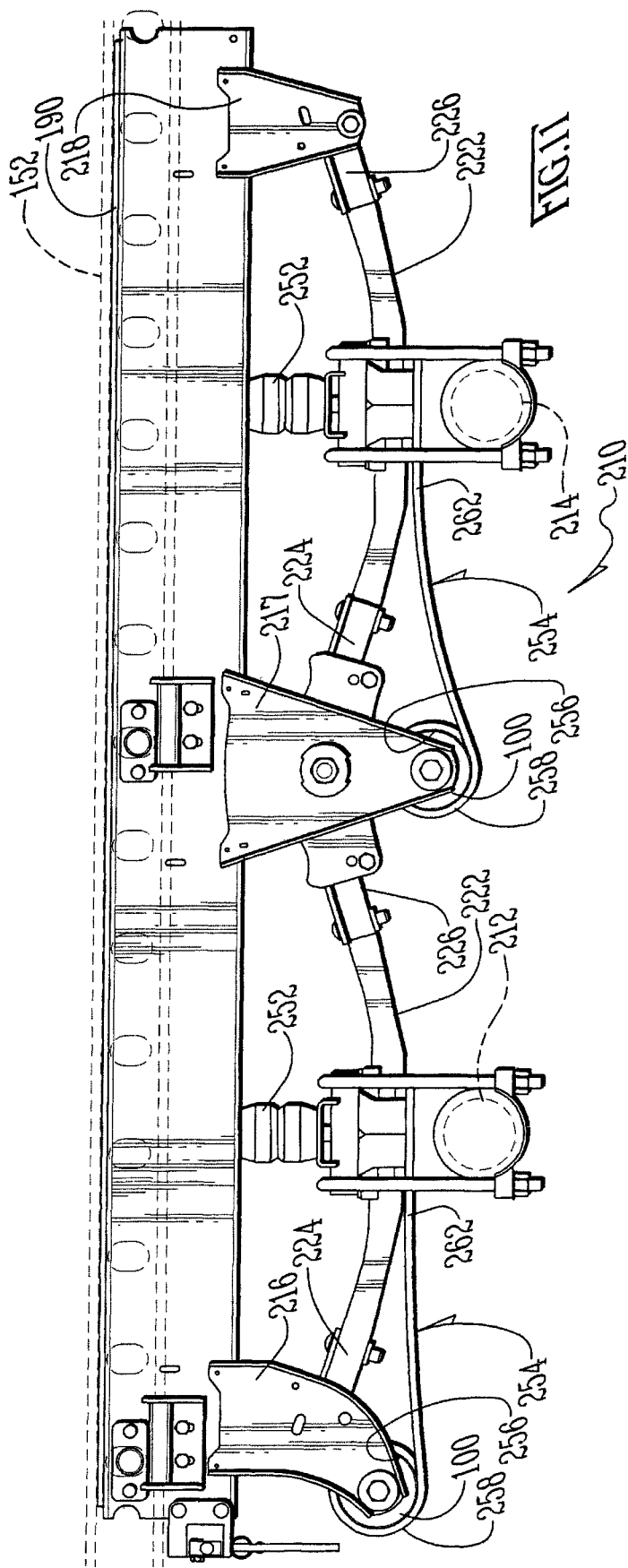
FIG. 11 is a side elevational view thereof.
Figure 12:
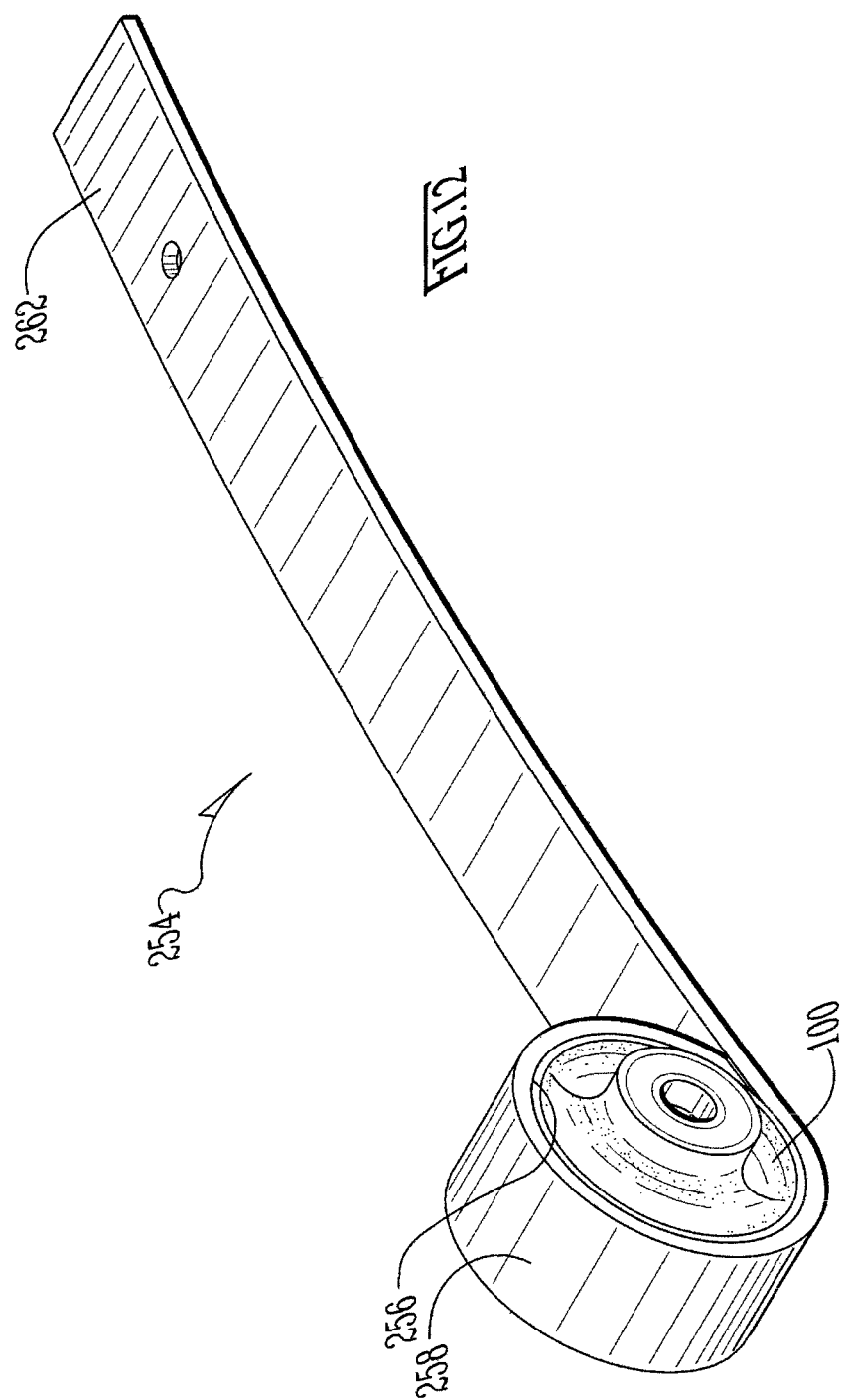
FIG. 12 is an enlarged-scale perspective view of the eyed leaf-spring control arm of standard leaf spring steel from FIGS. 10 and 11, except in isolation.

FIGS. 10-12 show a leaf-spring suspension system 210 in accordance with the invention and comparable to FIG. 4, with composite leaf springs 222, and, jounce bumpers 252, except wherein the rigid torque rod 205 is replaced with an eyed leaf-spring control arm 254 of standard leaf spring steel and with the eye 256 configured to receive the inventive compliant oversized pivot bushing 100. The end 258 of the control arm 254 with the eye 256 is the forward end 258, the opposite end is the trailing end 262, which is fastened or affixed to the axle seat (or axle housing) 236.

With general reference to FIGS. 2-9, the torque rod 205 in accordance with the invention has a simplified the axle alignment at the suspension hanger structures 216-218 with an eccentric pivot adjustment that moves in a slot (not shown) and then the through bolt 264 is torqued. This is in contrast to traditional adjustable torque rods that have many parts, are heavier, and are cumbersome to adjust. As FIG. 9 shows better, the inventive torque rod arm 266 has the forward bushing eye 268 being of oversized construction and the torque rod arm 266 will have a configuration that is not symmetric fore and aft.

With reference to FIGS. 4 and 5, the inventive suspension system 210 can accommodate composite style leaf springs 222 with or without a jounce bumper 252. To include a jounce bumper 252 allows for lighter weight springs 222 and, with the compliant oversized pivot bushing 100, would have improved ride performance.

FIGS. 7 and 8 show further aspects of the invention wherein, with a compliant oversized pivot bushing 100 mounted in the forward eye 238 of the torque rod 205, a seat bracket 272 can be added to the torque rod 205 to allow the mounting of an air spring 274 between the seat bracket 272 attached to the torque rod 205 and any opposite seat 276 which is a relatively 'grounded' with respect to the vehicle 150. That is, the opposite seat 276 can be attached to the respective hanger 216, the sub-frame 190, or perhaps even the tracks on the underside of the vehicle body or other parts of the vehicle frame 156. With this configuration and with an unloaded vehicle 150, the front axle 212 of the two tandem axles 212 and 214 can be lifted by supplying air pressure to this lift spring 272 to create a moment on the torque rod 205 and rotate it up around the through bolt 264 so as to lift the front axle 212 and hence lift the tires 158 off the ground, thereby increasing fuel mileage and tire life.

FIGS. 10-12 show still further aspects of the invention wherein the implementation of the compliant oversized pivot bushing 100 is incorporated in a leaf-spring suspension system 210 in which the rigid torque rod 205 is dispensed with and replaced by a control arm 254 which itself an eyed leaf spring. The control arm 254 has a forward eye 256 sized for receiving the compliant oversized pivot bushing 100. This not only eliminates the torque rod 205 but also eliminates the assemblies (eg., 242) for receiving the trailing end of the torque rod 205 for a simplified connection system. Again, this design would eliminate the extra parts of connecting a torque rod 205 to the axle seat (or axle housing) 236. The eyed-spring control arm 254 can be used with standard steel leaf springs or a composite spring design. This eyed-spring control arm 254 with a compliant oversized pivot bushing 100 would have better roll stability than a 'slipper leaf-spring 220 or 222 and torque rod design 205,' as it eliminates the extra axle seat 236 pivot points 242 that allow more suspension movement from lateral loading. Leaf-spring suspension systems in accordance with the invention and as shown by FIGS. 10-12 would be a good design for semi-trailer dollies, semi-trailer tankers, and vehicle 150 applications with high center of gravity loading.

It is yet another aspect of the invention that the various embodiments of the improved leaf-spring suspension systems 200 and 210 in accordance with the invention with compliant oversized pivot bushings 100 that can be used on various different vehicle 150 structures. These leaf-spring suspension systems in accordance with the invention can be mounted as a fixed hanger style suspension mounted directly to the vehicle frame 152 and/or 156 or else mounted by means of a sliding sub-frame style system 190 that allows the sub-frame 190 to move relative to the vehicle frame 152 (or 156) to optimize vehicle loading or maneuverability. Such leaf-spring suspension systems 200 and 210 in accordance with the invention which are mounted by means of sliding sub-frames 190 can also have an axle lift kit 272, 274 and 276 incorporated into the suspension system 200 or 210, as suggested by (and for example and without limitation) FIGS. 7 and 8.

Figure 13:
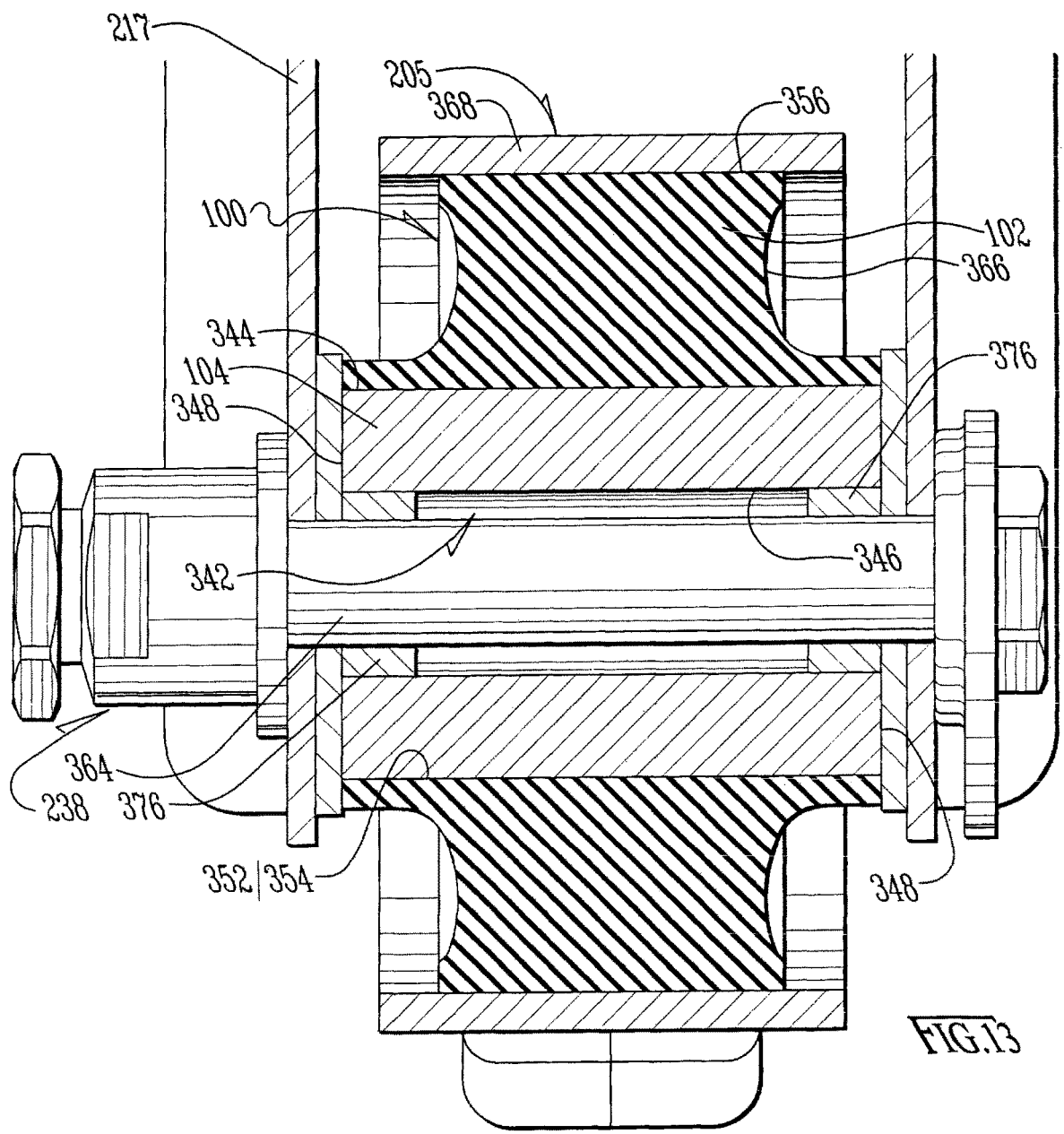
FIG. 13 is an enlarged-scale partial sectional view of detail XIII-XIII in FIG. 6.
Figure 14:
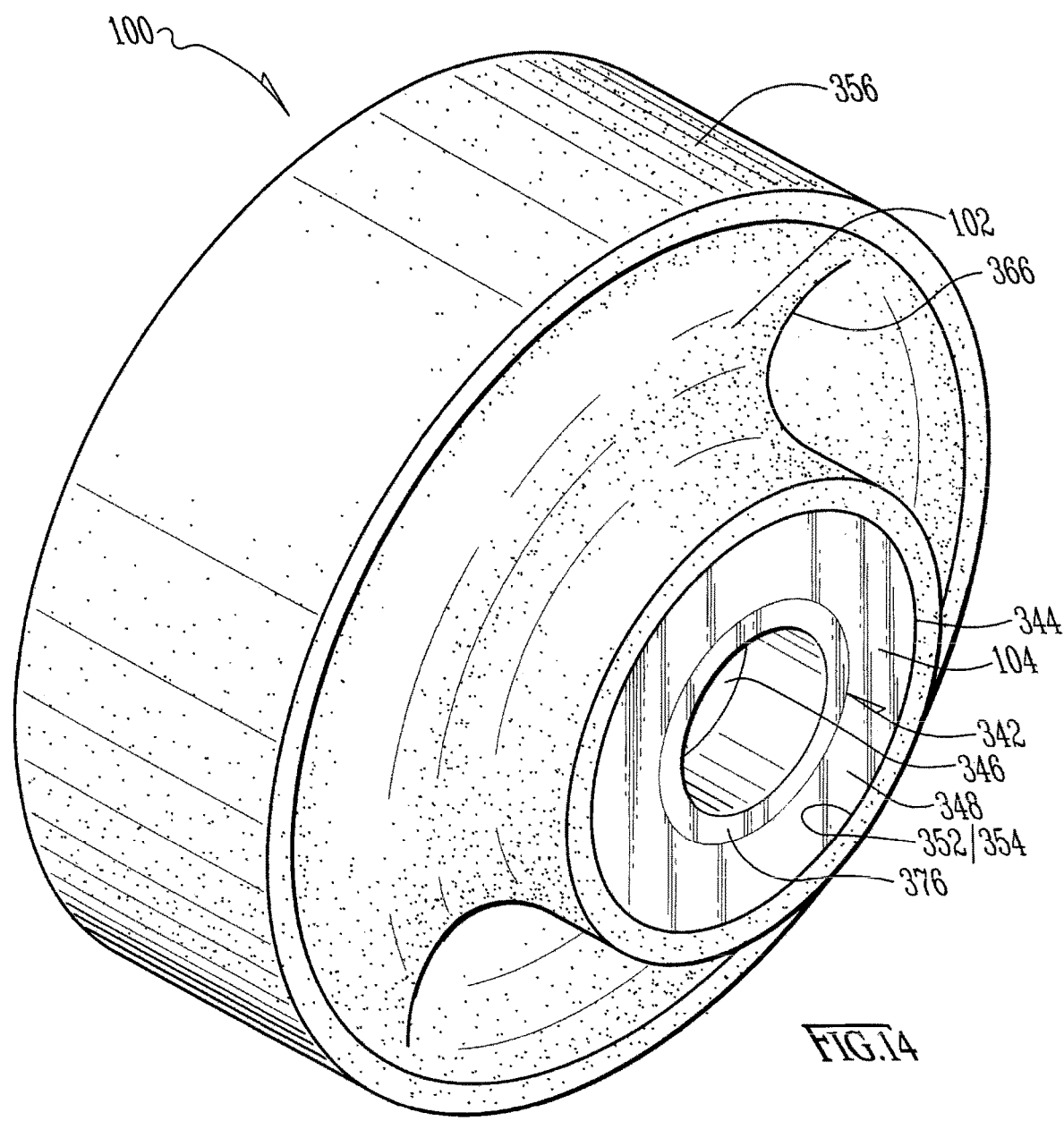
FIG. 14 is an enlarged-scale perspective view of the compliant oversized pivot bushing in isolation, and taken from FIG. 9.
Figure 15:
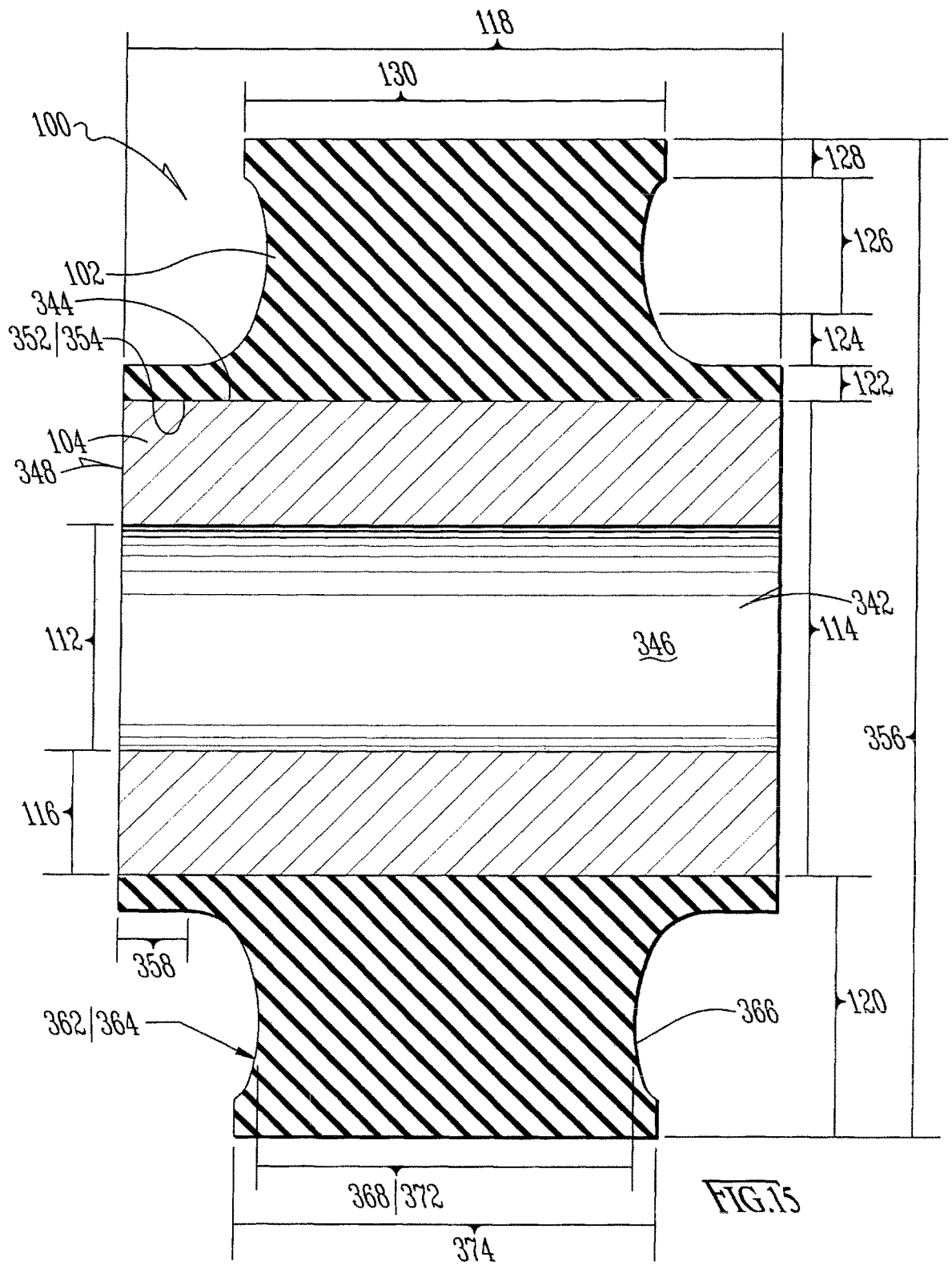
FIG. 15 is an enlarged-scale sectional view of the compliant oversized pivot bushing in isolation, and taken from FIG. 13.

With more particular reference to FIGS. 13-15, the compliant oversized pivot bushing 100 might have the following proportions, for example and without limitation. The bushing 100 comprises an elastomeric annulus 102 (eg., elastomeric torsion spring) mounted on a rigid sleeve 104.

The rigid sleeve 104 is preferably a stubby hollow cylinder of stainless steel or the like, having:—
- a central orifice 342 characterized by an inside diameter 112,
- an outer sidewall 344 characterized by an outside diameter 114,
- a wall thickness 116, measured between the inner sidewall 346 of the central orifice 342 and the outer sidewall 344, as well as
- a width 118 (ie., axial length) measured between spaced ends 348.

Representative measurements for rigid sleeve 104 might include the following as an example and without limitation:—
- inside diameter 112=1¼ inches (3.175 cm);
- outside diameter 114=2⅝ inches (6.6675 cm);
- wall thickness 116=11/16 inches (1.74625 cm); and
- width 118=3½ inches (8.89 cm).

To turn to the elastomeric annulus 102, the elastomeric annulus might comprise for example and without limitation the following characteristics, such as:—
- a central hollow core 352 characterized by an inside diameter 114 which is equal to the outside diameter 114 of the sleeve 104,
- an overall wall thickness 120 measured between the inner sidewall 354 of the central hollow core 354 and an outer sidewall 356,
- wherein the outer sidewall 356 characterized by an outside diameter 114,120,120 that is sum of the inside diameter 114 plus twice the wall thickness 120.

With more particular reference to FIG. 15, the cross-sectional profile of the elastomeric annulus 102 might vaguely be reckoned as resembling a mushroom-shaped profile. That is, the mushroom-shaped profile of the wall of elastomeric annulus might comprise for example and without limitation the following characteristics, such as:—
- a root spread 358 of thickness 122 with a width 118 equal to the width of the rigid sleeve 104,
- a root flare 362 of thickness 124 (also generally corresponding to a radius of curvature 364 for the root flare 362);
- an hourglass shaped stem portion 366 with a thickness 126 and a minimum width 368 at the waist 372 thereof, and
- a crown spread 374 of thickness 128 and width 130, which crown spread 374's outer surface 356 corresponds to the outer sidewall 356 for the elastomeric annulus 102.

Representative measurements for elastomeric annulus 102 might include the following as an example and without limitation:—
- inside diameter 114=2⅝ inches (6.6675 cm);
- overall wall thickness 120=1 11/16 inches (4.28625 cm);
- outside diameter 114,120,120=6 inches (15.24 cm)
- root spread 358 thickness 122=3/16th inch (0.47625 cm);
- root spread 358 width 118=3½ inches (8.89 cm);
- root flare 362 thickness 124=½ inch (1.27 cm);
- hourglass-shaped stem portion 366 thickness 126=¾th inch (1.905 cm);
- hourglass-shaped stem portion 366's minimum width 368 at waist 372=2 inches (5.08 cm);
- crown spread 374 thickness 128=¼th inch (0.635 cm); and
- crown spread 374 width 130=2¼ inches (5.715 cm).

For another example and without limitation, the elastomeric annulus 102 proportions could be a 2½ inch (6.35 cm) wide bushing 100 at width 118 with a 'free' outside elastomeric diameter 114,120,120 of at least 5 inches (12.7 cm).

As can be readily reckoned in FIGS. 13-15, the geometry of the bushing 100 and its eye mount 268 are all arranged on a cylindrical geometry where all cylindrical sidewalls are characterized by a common central axis of symmetry (ie., they all are co-axial on common central axis of symmetry. As better shown in FIG. 13, the through bolt 264 has a slightly smaller outside diameter than the inside diameter 112 of the central orifice 342 of the rigid sleeve 104. This creates an annular air gap between the inner sidewall 346 of the central orifice 342 and the through bolt 264. Nevertheless, the common symmetry between the through bolt 264 and central orifice 342 is maintained by a pair of annular, abbreviated spacer/sleeves 376 spaced apart at the inboard and outboard ends 348 of the rigid sleeve 348.

All the example measurements above are referred to as 'free' inasmuch as, where the measurements apply to the elastomeric annulus 102, the measurements are taken before it is compressed into the eye housing 268 therefor in the torque rod 205, and/or otherwise before there is any stress or distortion applied thereto.

In view of the foregoing, the vehicle suspension system in accordance with the invention can be summarized by the following.

A single or multi-axle leaf-spring vehicle suspension system could include:

at least a pair of compliant oversized pivot bushings 100 for each axle;

each compliant oversized pivot bushing comprising an elastomeric annulus mounted on a rigid sleeve;

said rigid sleeve 104 comprising a thick-walled cylinder, having:—
  an inner sidewall defining a central orifice and characterized by an inside diameter 112,
  an outer sidewall characterized by an outside diameter 114,
  a wall thickness 116, measured between the inner sidewall of the central orifice and the outer sidewall, as well as
  a width 118 (ie., axial length) measured between spaced ends;

said elastomeric annulus 102 comprising:—
  an inner sidewall defining central hollow core characterized by an inside diameter 114 which when mounted on the rigid sleeve 104 corresponds to the outside diameter 114 of the sleeve 104,
  an overall wall thickness 120 measured between the inner sidewall of the central hollow core and an outer sidewall, wherein
  the outer sidewall characterized an outside diameter 114, 120,120 that is sum of the inside diameter 114 plus twice the wall thickness 120;

wherein the sleeve is immovably mounted in the central hollow core of the elastomeric annulus;

wherein the rigid sleeve extends at least the entire width of the central hollow core of the elastomeric annulus; and wherein the rigid sleeve is provided with a central orifice to facilitate mounting of said compliant oversized pivot bushing to a vehicle suspension system hanger structure;

said suspension system further comprising a pair of elongate torque rods for each axle, each torque rod extending between a forward end and a spaced trailing end, each torque rod end formed with bushing eye housings at each of the forward end and trailing end, at least one of which bushing eye housings is sized and proportioned to accept the mounting therein of one of said compliant oversized pivot bushings in the forward or trailing end of the torque rod, the other end of the torque rod consisting of a conventional smaller type bushing configuration;

oversized bushing eye housing in the forward or trailing end of the torque rod has an inside diameter sized and proportioned to compress in the elastomeric annulus;

the elastomeric annulus having a free outside elastomeric diameter, when not pressed into the housing therefor, that is at least equal to or greater than twice the free width of the compliant oversized pivot bushing.

Optionally, the bushing is formed with a pair of spaced apart vertical voids (not shown) formed in the elastomeric annulus above and below the central rigid sleeve so that said bushing is more rigid in the horizontal plane of the bushing than in the direction of vertical plane that contains the voids in the elastomeric annulus when the said vehicle suspension is subjected to horizontal, vertical, and fore to aft loads.

Optionally, the elastomeric annulus has a variable width of from about 2.3 inches to about 3 inches at said peripheral ends and an overall outside diameter of about 5.5 inches to 6.5 inches whereby said bushing body is press-fitted into said torque rod eye housing therefor.

Optionally, the elastomeric annulus is produced from rubber having a durometer hardness of from about 70 to 90 Type A durometer hardness at about 70° F. (~20° C.).

Optionally, the elastomeric annulus is produced from polyurethane having a durometer hardness of from about 70 to 90 Type A durometer hardness at about 70° F. (~20° C.).

Optionally, the leaf springs are produced from a composite material and not steel.

Optionally, the suspension system in accordance with the invention further comprises a vehicle suspension sub-frame that is movable instead of fixed to the vehicle frame.

Optionally, the elastomeric annulus has a variable width comprising:
  a root spread of thickness 122 with a width 118 equal to the width of the rigid sleeve 118,
  a root flare of thickness 124 (also generally corresponding to a radius of curvature for the root flare);
  an hourglass shaped stem portion with a thickness 126 and a minimum width at the waist thereof, and
  a crown spread of thickness 128 and width 130, which crown spread's outer surface defines the outer sidewall for the elastomeric annulus 102; and
  the width 130 of the crown spread is less than twice the overall outside diameter of the elastomeric annulus.

Optionally, the width 130 of the crown spread is less than 2½ times the overall outside diameter of the elastomeric annulus.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A single or multi-axle slipper leaf-spring vehicle suspension system, comprising:
  a vehicle hanger structure comprising a pair of laterally-spaced forward hangers for each axle;
  a pair of laterally-spaced elongate torque rods for each axle, each torque rod extending between a forward end and a spaced trailing end, wherein the forward end of the torque rod is formed with an oversized-bushing eye-housing;
a pair of hanger bolts for each axle, each hanger bolt characterized by a bolt diameter; and
a pair of compliant oversized pivot bushings (100) for each axle;
each compliant oversized pivot bushing (100) comprising an elastomeric annulus (102) mounted on a rigid sleeve (104);
said rigid sleeve (104) comprising a thick-walled cylinder, having:—
 an inner sidewall defining a central orifice and characterized by an inside diameter (112),
 an outer sidewall characterized by an outside diameter (114), and
 a width (118) measured between spaced ends;
said elastomeric annulus (102) comprising:—
 an inner sidewall defining central hollow core characterized by an inside diameter (114) which when mounted on the rigid sleeve (104) corresponds to the outside diameter (114) of the rigid sleeve (104), and
 an outer sidewall characterized by an outside diameter (114,120,120) for the elastomeric annulus (102),
wherein each rigid sleeve (104) is immovably mounted in the central hollow core of the elastomeric annulus (102);
wherein each elastomeric annulus (102) is immovably mounted in the oversized-bushing eye-housing of the forward end of the torque rod;
wherein the bolt inserts through the central orifice of the rigid sleeve (104) to mount the torque rod to the forward hanger;
wherein the outside diameter (114) of the rigid sleeve (104) is at least equal to twice or greater than twice the bolt diameter; and
wherein said elastomeric annulus has a variable width comprising:
 a root spread of thickness (122), the root spread having a width (118) equal to the width (118) of the rigid sleeve (104), and
 a root flare, and
 a crown spread having a width (130), which crown spread's outer surface defines the outer sidewall for the elastomeric annulus; and
the width (130) of the crown spread is less than twice the overall outside diameter of the elastomeric annulus.

2. The suspension of claim 1 wherein:
the width (130) of the crown spread is less than 2½ times the overall outside diameter of the elastomeric annulus.

3. The suspension of claim 1 wherein:
the spaced ends of the rigid sleeve (104) are planar, are parallel with one another and are perpendicular to a central axis of the rigid sleeve;
said rigid sleeve (104) has a wall thickness (116), measured between the inner sidewall of the central orifice of the rigid sleeve (104) and the outer sidewall of the rigid sleeve (104); and
the wall thickness (116) of the rigid sleeve (104) is at least equal to or greater than ⅝ inch (1.5875 cm);
whereby, the outer sidewall of the rigid sleeve (104) and inner sidewall of the elastomeric annulus (102) mount along an annular contact surface area, and when the spaced ends of the rigid sleeve (104) are bolted and clamped tightly between co-planar washers or hanger flanges, each spaced end of the rigid sleeve (104) defines with respect to the respective co-planar washer or hanger flange a planar clamping contact surface area;
wherein the planar clamping contact surface area is sized or oversized to clamp the rigid sleeve (104) tightly against relative movement with respect to the forward hanger concurrently as the annular contact surface area between the outer sidewall of the rigid sleeve (104) and inner sidewall of the elastomeric annulus (102) is sized or oversized in respect of diameter (114) and width (118) to reduce/eliminate rocking/precession movement.

4. The suspension of claim 3 wherein:
said elastomeric annulus has a variable width of from 2.3 inches to 3 inches and an overall outside diameter of 5.5 inches to 6.5 inches.

5. The suspension of claim 3 wherein:
the root spread has spaced ends respectively co-planar with the respective spaced ends of the of the rigid sleeve (104);
the thickness (122) of the root spread is at least equal to or greater than ⅛ inch (0.3175 cm);
when the spaced ends of the rigid sleeve (104) with the respective co-planar spaced ends of the root spread are bolted and clamped tightly between co-planar washers or hanger flanges, each spaced end of the rigid sleeve (104) and the respective co-planar spaced end of the root spread defines with respect to the respective co-planar washer or hanger flange a planar combined clamping-and-sealing contact surface area;
whereby, when not only the spaced ends of the rigid sleeve (104) but concurrently the spaced ends of the root spread are bolted and clamped tightly between co-planar washers or hanger flanges, the planar combined clamping-and-sealing contact surface area is sized or oversized such that the ends of the root spread serve as a weather and/or contaminant seal.

6. A single or multi-axle slipper leaf-spring vehicle suspension system, comprising:
a vehicle hanger structure comprising a pair of laterally-spaced forward hangers for each axle;
a pair of laterally-spaced elongate torque rods for each axle, each torque rod extending between a forward end and a spaced trailing end, wherein the forward end of the torque rod is formed with an oversized-bushing eye-housing;
a pair of hanger bolts for each axle, each hanger bolt characterized by a bolt diameter; and
a pair of compliant oversized pivot bushings (100) for each axle;
each compliant oversized pivot bushing (100) comprising an elastomeric annulus (102) mounted on a rigid sleeve (104);
said rigid sleeve (104) comprising a thick-walled cylinder, having:—
 an inner sidewall defining a central orifice and characterized by an inside diameter (112),
 an outer sidewall characterized by an outside diameter (114), and
 a width (118) measured between spaced ends;
said elastomeric annulus (102) comprising:—
 an inner sidewall defining central hollow core characterized by an inside diameter (114) which when mounted on the rigid sleeve (104) corresponds to the outside diameter (114) of the rigid sleeve (104), and
 an outer sidewall characterized by an outside diameter (114,120,120) for the elastomeric annulus (102), wherein each rigid sleeve (104) is immovably mounted in the central hollow core of the elastomeric annulus (102);

wherein each elastomeric annulus (102) is immovably mounted in the oversized-bushing eye-housing of the forward end of the torque rod;

wherein the bolt inserts through the central orifice of the rigid sleeve (104) to mount the torque rod to the forward hanger;

wherein the outside diameter (114) of the rigid sleeve (104) is at least equal to twice or greater than twice the bolt diameter; and wherein the inside diameter (112) of the central orifice of the rigid sleeve (104) is greater than the bolt diameter; and the outside diameter (114) of the rigid sleeve (104) is at least equal to twice or greater than twice the inside diameter (112) of the central orifice of the rigid sleeve (104).

7. The suspension of claim 6 further comprising:

annular spacers between the bolt and the rigid sleeve (104).

8. The suspension of claim 6 wherein:

the width (118) of the rigid sleeve (104) is greater than the outside diameter (114) of the rigid sleeve (104).

9. The suspension of claim 8 wherein:

the width (118) of the rigid sleeve (104) is less than the outside diameter (114,120,120) of the elastomeric annulus (102).

10. The suspension of claim 6 wherein:

the torque rod is not symmetric fore to aft such that the forward end is larger and the trailing end is compact.

11. The suspension of claim 10 wherein:

the trailing end is formed with a smaller conventional bushing than the oversized bushing.

12. A single or multi-axle slipper leaf-spring vehicle suspension system, comprising:

a vehicle hanger structure comprising a pair of laterally-spaced forward hangers for each axle;

a pair of laterally-spaced elongate torque rods for each axle, each torque rod extending between a forward end and a spaced trailing end, wherein the forward end of the torque rod is formed with an oversized-bushing eye-housing;

a pair of hanger bolts for each axle, each hanger bolt characterized by a bolt diameter;

a pair of compliant oversized pivot bushings for each axle;

each compliant oversized pivot bushing comprising an elastomeric annulus mounted on a rigid sleeve;

said rigid sleeve defining a central orifice characterized by an inside diameter (112);

said elastomeric annulus defining central hollow core characterized by an inside diameter (114);

said elastomeric annulus characterized by an outside diameter (114,120,120);

wherein each elastomeric annulus is immovably mounted in the oversized-bushing eye-housing of the forward end of the respective torque rod therefor and is immovably mounted with respect to the respective rigid sleeve therefor;

wherein the bolt inserts through the central orifice of the rigid sleeve to mount the torque rod to the forward hanger;

wherein the inside diameter (114) of the elastomeric annulus is at least equal to twice or greater than twice the bolt diameter;

wherein the spaced ends of the rigid sleeve (104) are planar, are parallel with one another and are perpendicular to a central axis of the rigid sleeve;

said rigid sleeve (104) has a wall thickness (116), measured between an inner sidewall of the central orifice of the rigid sleeve (104) and an outer sidewall of the rigid sleeve (104); and the wall thickness (116) of the rigid sleeve (104) is at least equal to or greater than ⅝ inch (1.5875 cm);

whereby, the outer sidewall of the rigid sleeve (104) and inner sidewall of the elastomeric annulus (102) mount along an annular contact surface area, and when the spaced ends of the rigid sleeve (104) are bolted and clamped tightly between co-planar washers or hanger flanges, each spaced end of the rigid sleeve (104) defines with respect to the respective co-planar washer or hanger flange a planar clamping contact surface area;

wherein the planar clamping contact surface area is sized or oversized to clamp the rigid sleeve (104) tightly against relative movement with respect to the forward hanger concurrently as the annular contact surface area between the outer sidewall of the rigid sleeve (104) and inner sidewall of the elastomeric annulus (102) is sized or oversized in respect of diameter (114) and width (118) to reduce/eliminate rocking/precession movement; and wherein said elastomeric annulus has a variable width comprising at least:

a root spread of thickness (122), the root spread having a width (118) equal to the width (118) of the rigid sleeve (104), and a root flare, wherein the root spread has spaced ends respectively co-planar with the respective spaced ends of the of the rigid sleeve (104); and wherein the thickness (122) of the root spread is at least equal to or greater than ⅛ inch (0.3175 cm);

whereby, when not only the spaced ends of the rigid sleeve (104) but concurrently the spaced ends of the root spread are bolted and clamped tightly between co-planar washers or hanger flanges, the contact surface area is sized or oversized such that the ends of the root spread serve as a weather and/or contaminant seal.

13. The suspension of claim 12 wherein:

the inside diameter (112) of the central orifice of the rigid sleeve is greater than the bolt diameter; and the inside diameter (114) of the elastomeric annulus is at least equal to twice or greater than twice the inside diameter (112) of the central orifice of the rigid sleeve.

14. The suspension of claim 13 further comprising:

annular spacers between the bolt and the rigid sleeve (104).

15. The suspension of claim 12 wherein:

the torque rod is not symmetric fore to aft such that the forward end is larger and the trailing end is compact.

16. The suspension of claim 15 wherein:

the trailing end is formed with a smaller conventional bushing than the oversized bushing.

17. The suspension of claim 12 wherein:

said elastomeric annulus has a variable width of from 2.3 inches to 3 inches and an overall outside diameter of 5.5 inches to 6.5 inches.

\* \* \* \* \*